United States Patent
Lal

(10) Patent No.: US 9,323,589 B2
(45) Date of Patent: Apr. 26, 2016

(54) SELF REGISTRATION OF EVENT—CONSUMERS/PRODUCERS AND AUTO DISCOVERY

(75) Inventor: Sunil Lal, Kundalahally (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 814 days.

(21) Appl. No.: 13/471,790

(22) Filed: May 15, 2012

(65) Prior Publication Data

US 2013/0311574 A1    Nov. 21, 2013

(51) Int. Cl.
*G06F 15/16* (2006.01)
*G06F 9/54* (2006.01)
*H04L 29/08* (2006.01)

(52) U.S. Cl.
CPC .............. *G06F 9/542* (2013.01); *H04L 67/32* (2013.01); *G06F 2209/544* (2013.01)

(58) Field of Classification Search
CPC .... G06F 9/542; G06F 2209/544; H04L 67/32
USPC ......................................... 709/206, 204, 208
See application file for complete search history.

(56) References Cited

U.S. PATENT DOCUMENTS

| | | | |
|---|---|---|---|
| 6,105,100 A | 8/2000 | Dean et al. | |
| 6,108,779 A | 8/2000 | Dean et al. | |
| 6,795,846 B1 | 9/2004 | Merriam | |
| 7,571,444 B2 | 8/2009 | Araujo et al. | |
| 7,594,267 B2 | 9/2009 | Gladstone et al. | |
| 7,640,329 B2 * | 12/2009 | Rao et al. | 709/223 |
| 7,681,203 B2 | 3/2010 | Mandato et al. | |
| 7,840,611 B2 | 11/2010 | Potter et al. | |
| 7,992,155 B2 | 8/2011 | Hunsinger et al. | |
| 2006/0137005 A1 * | 6/2006 | Park | 726/21 |
| 2012/0066372 A1 * | 3/2012 | Jennings et al. | 709/224 |
| 2013/0128894 A1 * | 5/2013 | Shah et al. | 370/401 |

FOREIGN PATENT DOCUMENTS

EP    759591 B1    1/2003

OTHER PUBLICATIONS

Apache Software Foundation (ASF), "EV-Jini Distributed Events Specification," Version 1.0, pp. 1 thru 20, Apache Software Foundation (ASF), http://river.apache.org/doc/specs/html/event-spec.html.

* cited by examiner

*Primary Examiner* — Vivek Srivastava
*Assistant Examiner* — Normin Abedin
(74) *Attorney, Agent, or Firm* — Kraguljac Law Group, LLC

(57) ABSTRACT

Systems, methods, and other embodiments associated with automatic registration and discovery of services in a network using a platform independent interface are described. In one embodiment, a method includes receiving a request from an event producer on the network to add an entry to a registration table. The example method may also include broadcasting a message to devices on the network to announce the presence of the event producer.

17 Claims, 6 Drawing Sheets

SELF REGISTRATION OF EVENT—CONSUMERS/PRODUCERS AND AUTO DISCOVERY

BACKGROUND

Devices in a computer network interact in many ways. Internet services, remote access, e-mail, and distributed computing are all examples of services where devices use a network to interact. Many of these technologies are based on client-server architectures. That is, an environment where a client sends a request to a server for the server to perform some processing or provide information. However, these technologies suffer from difficulties with cross-platform compatibility.

For the client and server to interact they both need to speak the same language, yet different programming languages are often used to implement the client and the server leading to difficulties when attempting to communicate.

Additionally, for the client to send a request to a server, the client first needs to know the location of the server and services it provides. However, difficulties with discovering devices (e.g., servers) that are capable of handling requests also hinder client-server architectures.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
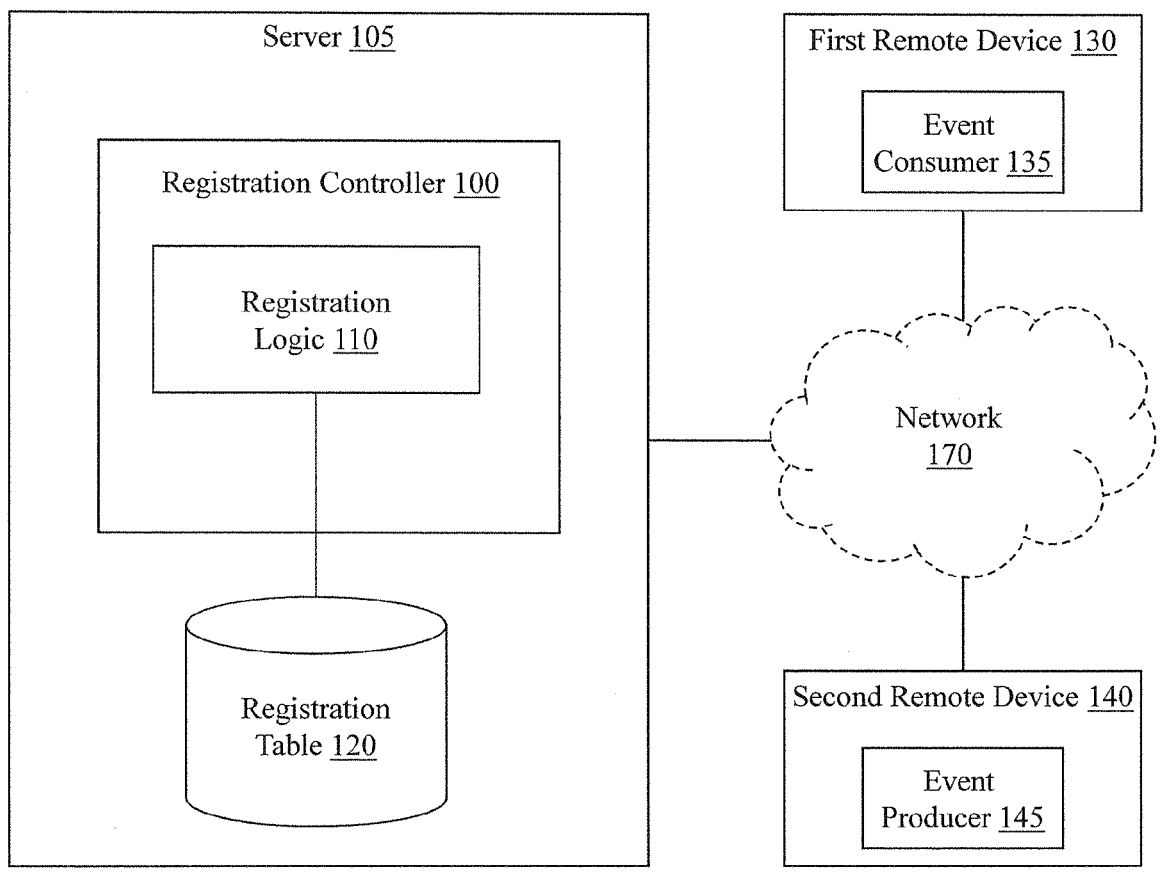
FIG. 1 illustrates one embodiment of a registration controller associated with automatic registration and discovery of services in a network.

Systems, methods and other embodiments are described herein that provide techniques for self registration of event-consumers/producers with a local DNS and auto discovery by event producers. Interactions between clients and servers in a network are improved with automatic discovery of event producers and event consumers using platform independent interfaces. For example, consider a domain name system (DNS) server in a network. A DNS server provides name resolution and registration services in the network so that a device in the network can discover and communicate with other devices by using services of the DNS server. When a device is connected to a network for the first time, the DNS server registers a name and address for the device in a registry. From this registration information other devices in the network can contact the DNS server to determine an address for the new device when attempting to communicate with the device.

Typically, the DNS server is not aware of general attributes of the newly connected device, such as, services running on the device and so on. However, by modifying the initial registration with the DNS server to include additional information about the device, discovery of services in the network can be simplified. Accordingly, the additional information provided during the initial registration includes, for example, services running on the device, whether the device is capable of servicing events from other devices, and so on. In this way, the DNS server can provide information about services used by the device to other devices in the network facilitating discovery of services associated with the device by other devices on the network.

Consider a device that is newly connected to a network. When the DNS server receives a request to add the device to the registry, the DNS server also registers information about services associated with the device. The additional information about services associated with the new device is included with the request from the device. In other examples, the DNS server may probe the new device for the additional information if it is not included with the request. However, in either case, the DNS server now maintains more information about the device and services used by or available on the device.

With this additional information, the DNS server can facilitate discovery by other devices in the network in several ways. One example of this is for the DNS server to broadcast a message to devices in the network about the presence and services of the new device. This broadcast can be a directed message that is sent to only devices associated with the same services as the new device or a true broadcast message to all devices on the network. As a result of broadcasting the message to devices in the network, those devices are made aware of the new device and devices associated with services of the new device are thereby induced to begin communicating with the new device.

In addition to automatically registering services for devices on the network, the server uses a platform independent interface to provide the registration and discovery services. For example, a network can include devices of different types. The different types of devices not only differ in physical aspects but may also differ in the languages with which they are programmed and communicate. Thus, a platform independent interface allows heterogeneous devices to seamlessly use the registration services of the same DNS server without providing specific compatibility interfaces for each different device.

In one embodiment, the DNS server uses the platform independent application programming interface (API) to provide access to the registry for the devices on the network. To provide compatibility among the different devices the registry is, for example, an XML data structure. Thus, the requests to the DNS server and messages provided by the DNS server also include data in an XML format in order to promote platform independence.

With reference to FIG. 1, one embodiment of a server 105 that includes a registration controller 100 is illustrated. The registration controller 100 is configured to provide automatic discovery of event consumers and/or event producers in a network 170. The network 170 may be a transmission control protocol/Internet protocol (TCP/IP) or other network that includes, for example, wireless and/or wired communication channels. The communication channels connect a collection of devices that share resources and information. For example, the network 170 provides for client-server communications, distributed computing, event-driven computing, and so on. Thus, the network 170 permits devices to interact and share resources.

In FIG. 1, the server 105, a first remote device 130, and a second remote device 140 are examples of devices that communicate using the network 170. Of course, other devices may be connected to the network 170. In one embodiment, the server 105 is a lightweight directory access protocol (LDAP) server. In other embodiments, the server 105 is a DNS server or a DNS server that is integrated with an LDAP server. The first and second remote devices 130 and 140 are examples of devices that participate in distributed computing across the network 170 and that use the server 105 to discover devices on the network. Event producer 145 and event consumer 135 are examples of executable services running on the respective remote devices 140 and 130.

In one embodiment, an event producer is an executing application that produces software events (messages). An event listener/consumer is an application service running in a remote machine that has registered itself with the event producer and which listens and responds to the events generated by the event producer. Thus, in order for the event consumer 135 to process events produced by the event producer 145 a connection between the devices is first established. To establish the connection, either the event producer 145 or the event consumer 135 initiates communication.

By way of example, consider that the first remote device 130 and its event consumer 135 are registered with the server 105, which is functioning as a DNS server that includes lightweight directory access protocol (LDAP) services. The registration table 120 includes entries for the first remote device 130 and the event consumer 135. The entries describe the location of the first remote device 130 and provide information about the event consumer 135. Further consider, that the event consumer 135 is, for example, a network layer security service in the network. In another embodiment, the event consumer 135 is, for example, a web service that provides services related to a web based application, and so on. At some point after the first remote device 130 has been connected to the network 170, the second remote device 140 is connected to the network 170. On the occurrence of this connection, the second remote device 140 transmits a registration request to the server 105.

Upon receiving the request, the registration logic 110 in the registration controller 100 of the server 105 adds an entry for the second remote device 140 to the registration table 120. The entry includes information for the event producer 145, which is operating on the second remote device 140. The information for the event producer 145 describes characteristics of the event producer 145 that include, for example, a version number of an application associated with the event producer 145, configuration information, and so on. The information for the event producer 145 may also include configuration information for the second remote device 140 that describes a processing capability of the second remote device 140 and other relevant operating characteristics.

In addition to being configured to handle requests to add entries into the registration table 120, the registration logic 110 automatically informs event consumers (e.g., event consumer 135) on the network 170 about the registration of the event producer 145. In one embodiment, the registration logic 110 analyzes the new entry for the event producer 145 after it has been added to the registration table 120. By analyzing the new entry, the registration logic 110 can determine if there are any event consumers, such as event consumer 135, which can handle requests from the event producer 145 (e.g., based on matching or common characteristics/functions). The registration logic 110 is configured to account for characteristics of the event producer 145 when analyzing the new entry to determine associated event consumers. For example, the characteristics include an application version number, processing requirements for produced events, and so on. Analyzing the new entry can include the registration logic 110 using the registration table 120 and the characteristics of the event producer 145 to search for associated event consumers.

In one example, the registration table 120 is a database that is configured with relational elements and is stored in a non-transitory computer readable medium. The relational elements link event producers to associated event consumers in the registration table 120. Thus, the registration logic 110 can use the relational elements to lookup event consumers for the event producer. Suppose that in this example, event consumer 135 is the only event consumer capable of processing events of the type that are generated from event producer 145 as determined from the relational elements in the table 120. The registration logic 110 generates a message to send to the event consumer 135 that describes the event producer 145. If multiple event consumers are available the registration logic 110 may select a subset of event consumers, or a message can be generated and sent to all available event consumers. Additionally, in still other embodiments, the registration logic 110 can send a message to all devices on the network 170 without determining whether there is a particular event consumer for the event producer 145.

Continuing with the present example, the event consumer 135 in the first remote device 130 receives the message sent by the registration logic 110 in the server 105. The message is an alert to the event consumer 135 that indicates the presence of the newly registered event producer 145. In one embodiment, the message includes only an identifier for the event producer 145, while in other embodiments the message may include additional information that provides more details to the event consumer 135 about the event producer 145.

After receiving the message, the event consumer 135 responds by transmitting a reply to the server 105 with a request for additional information about the newly registered second device 140. In response to the reply, the registration logic 110 is configured to provide the information about the event producer 145 from the registration table 120 back to the event consumer 135. After receiving the information, the event consumer 135 initiates communications with the event producer 145. Communications between the event producer 135 and the event consumer 145 inform the event producer 145 that the event consumer 135 is available and capable of processing its events. The communications may also include an exchange of security information and/or other parameters used when processing events for the event producer 145. Thereafter, the event producer 145 directs events to event consumer 135 for processing. The event producer 145 provides the events to the event consumer 135 in the form of, for example, remote procedure calls (RPC), HTTP requests, and so on.

Figure 2:
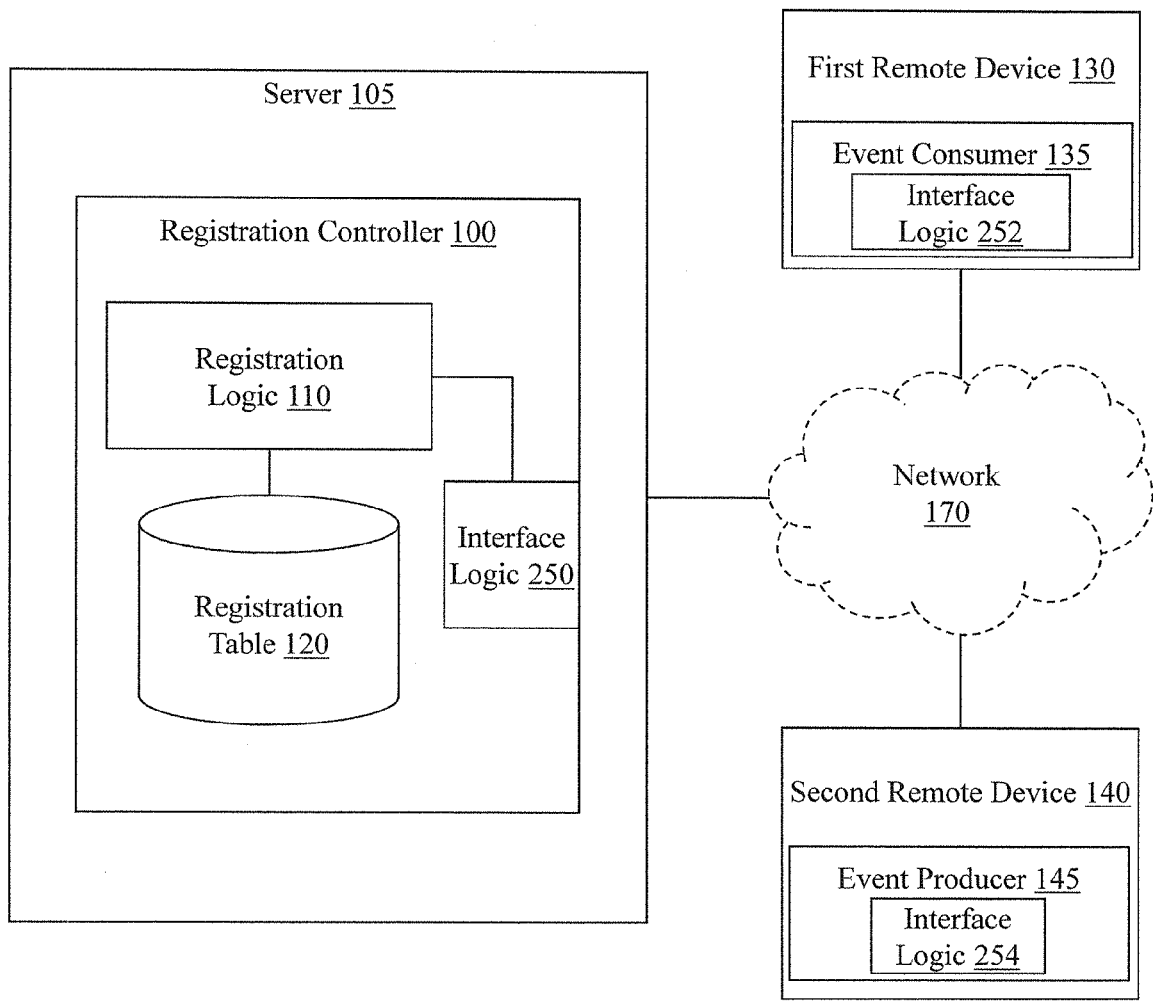
FIG. 2 illustrates another embodiment of a registration controller associated with automatic registration and discovery of services in a network.

The components by which the server 105, the first remote device 130, and the second remote device 140 communicate are discussed in greater detail with reference to FIG. 2. FIG. 2 illustrates elements similar to those of FIG. 1. For example, FIG. 2 shows a server 105 with a registration controller 100, a first remote device 130, and a second remote device 140. However, in FIG. 2, the registration controller 100 includes an interface logic 250 in addition to the registration logic 110 and the registration table 120 illustrated in FIG. 1. Additionally, the event consumer 135 and the event producer 145 include respective interface logics 252 and 254.

In one embodiment, the interface logics 250, 252, 254 are application programming interfaces (API) that provide platform independent communication channels between the server 105 and devices connected to the network 170 (e.g., first remote device 130, second remote device 140). For example, the interface logic 250 provides a path for communications received from the network 170 to the registration logic 110 in the registration controller 100. In this way, communications between the server 105 and devices on the network 170 (e.g., first remote device 130, second remote device 140) are independent of a programming language or operating platform that is native to the server 105. Accordingly, the functionality of the registration logic 110 and data in the registration table 120 is accessible and exposed directly to devices on the network 170 without intervention from, for example, an operating system in the server 105. In one embodiment, the interface logic 250 is an API that interacts directly with the application layer in the network communication stack to direct communications to and from the registration controller 100.

The network communication stack is a stack of protocols used by, for example, the server 105 to communicate via a network interface card (NIC) over the network 170. The network stack is, for example, compatible with the seven layer OSI model in which the application layer is a top layer (e.g., layer 7) above the presentation layer (e.g., layer 6). In other embodiments, the network stack is compatible with the four layer TCP/IP model in which the application layer is the top layer (e.g., layer 4) above the transport layer (e.g., layer 3).

Furthermore, the interface logic 250 is configured to expose portions of the registration table 120 to the network devices (e.g., 130, 140) so that the devices can query and access data in the registration table 120 as well as add information to the registration table 120. The data in the registration table 120 is, for example, XML data in XML templates for each entry. Accordingly, each entry in the registration table 120 includes an XML template with data about a device in the network 170. For example, when the second remote device 140 sends a request to server 105 to be added to the registration table 120, the request includes XML data that is used to fill in an XML template for the second remote device 140 in the registration table 120. The XML template for the second remote device 140 includes information about the event producer 145. The registration controller 100 uses the data in the XML template to generate messages to broadcast to the network 170 and to fulfill inquiries by devices in the network 170.

By exposing the XML template through the interface logic 250 to devices on the network 170, the remote devices can access the XML template in the registration table 120 without taking additional steps to account for a native language or specific protocol of the server 105. In this way, communicating with the server 105 to register and discover devices in the network is platform independent, that is, communications are not bound to a programming language of any specific device.

Additionally, the interface logics 252 and 254 in the remote devices 130 and 140, respectively are configured to provide the ability to communicate independently of a native language of the first remote device 130 and the second remote device 140 with the server 105. Thus, when communicating with the server 105, the first remote device 130 is configured to use the interface logic 252 to mediate/translate the communications transmitted between the devices. Accordingly, in the remote device 130, messages received from the server 105 and messages transmitted to the server 105 are communicated using the interface logic 252. The interface logics 252 and 254 provide, for example, translational services between the format of the communications and the local device (e.g., first remote device 130).

Figure 3:
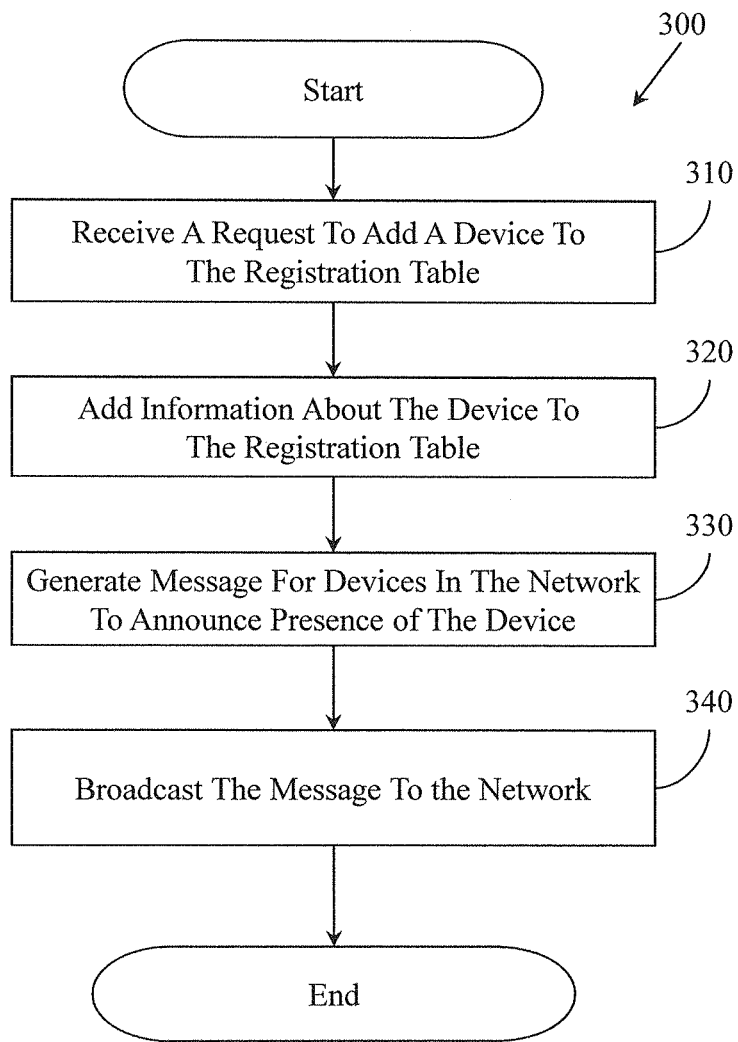
FIG. 3 illustrates one embodiment of a method associated with automatic registration and discovery of services in a network.

Further details of automatic registration and discovery of event producers/consumers in a network will be discussed in conjunction with FIG. 3. FIG. 3 illustrates one embodiment of a method 300 associated with automatic registration and discovery of event producers/consumers in a network. FIG. 3 is discussed from the perspective that the method 300 is implemented and performed by, for example, the server 105 of FIG. 1.

At 310, a request is received to add a device to the registration table. The request is sent by a device that has been newly connected to the network. The device sends the request, for example, in response to being initially plugged into the network. In this way, the device can establish a connection with the server to provide registration information to the server in order to quickly register and begin interacting with other event consumers/producers on the network.

In one embodiment, the request is a domain name system (DNS) registration request that includes additional information. The additional information with the request is information that is not required for DNS registration purposes, but is instead information about an event consumer or event producer that resides on the device that provided the request. By including the event consumer/producer information in the request, the server 105 can facilitate automatic discovery of the new device by other devices on the network.

In one embodiment, the request is provided in a format that, for example, complies with general standards for a DNS registration request but also includes the additional information in a form that is compatible across different types of computing systems. The additional information may be in an XML format so that an XML template in the registration table for the new entry can be filled-in.

At 320, identifiers and information for the device are added to the registration table. In one embodiment, adding the information about the device to the table includes an interface in the server 105 processing the information into an XML template in the registration table. The interface is, for example, an application programming interface (API) that is triggered upon the receipt of the request. Since the request includes information for DNS registration and the additional information about an event consumer/producer in the device, the interface parses the request for the event consumer/producer information and inserts it into an XML template in the registration table. In this way, the request serves a dual purpose of registering the device for DNS purposes and also registering the event consumer/producer to facilitate discovery of the event consumer/producer in the network.

At 330, a message is generated that is to be sent to one or more devices on the network to announce the presence of the newly registered device and the new event producer/consumer. The message includes, for example, a portion of the information from the XML template. The entirety of the information from the XML template is not included since all of the devices that receive the message may not need all of the information. Thus in one embodiment, including all of the information in the message would be inefficient. Accordingly, the message includes sufficient information for the receiving device to identify whether the new device is a device with which interactions are desired. This determination may be based on whether a processing load of the device that receives the message is beyond an acceptable limit or whether a version of an event consumer/producer is compatible with the new device.

At 340, the message that was generated at 330 is broadcast to the network. By providing the message to devices on the network, the devices are made aware of the presence of the new device and can begin interacting with the device. As mentioned at 330, however, the message can be directed to a subset of the devices on the network depending on, for example, characteristics about the new device and available devices on the network.

Figure 4:
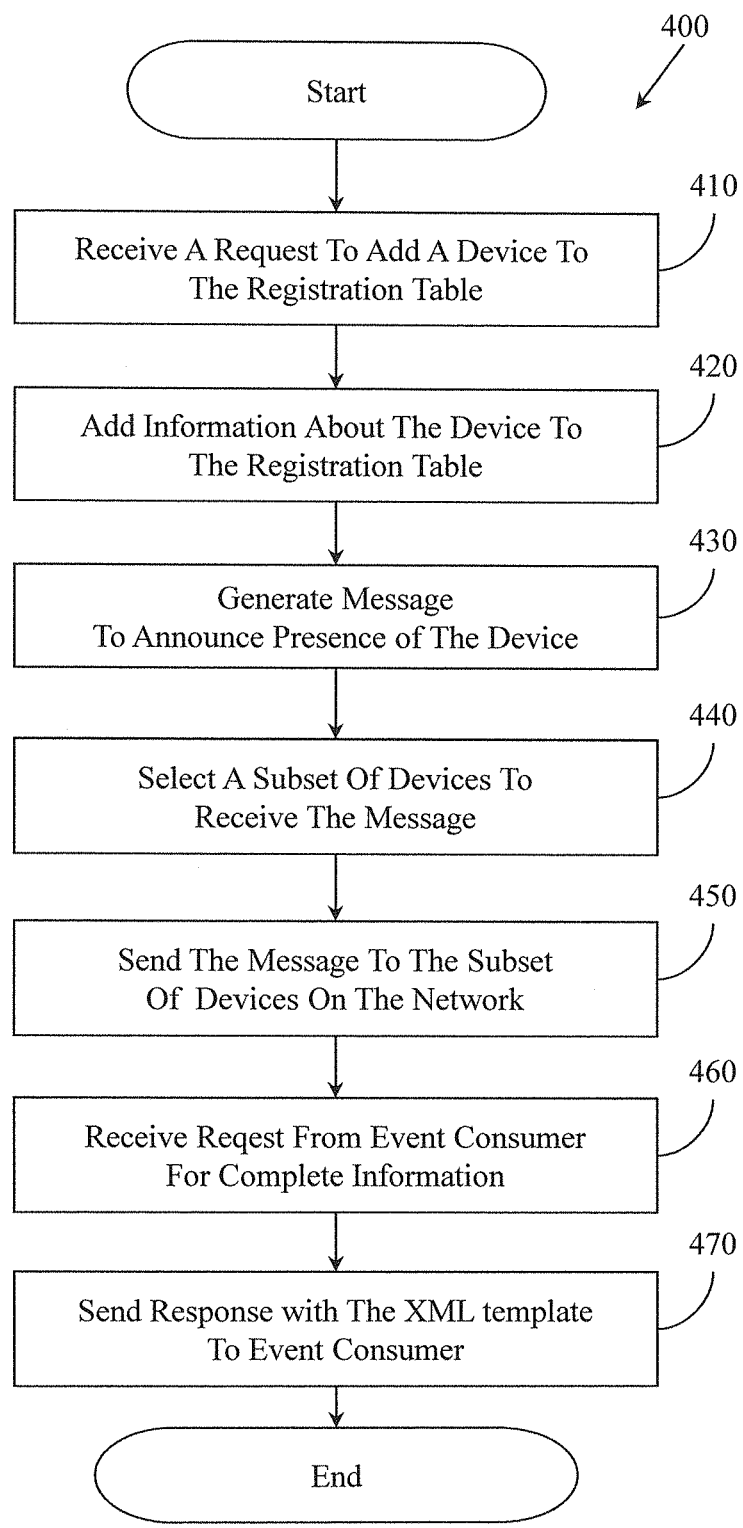
FIG. 4 illustrates an embodiment of a method associated with automatic registration and discovery of services in a network.

Further details of automatically discovering event producers/consumers in a network will be discussed in conjunction with FIGS. 4-5. FIG. 4 illustrates one embodiment of a method 400 associated with automatically discovering event producers in a network. FIG. 4 is discussed from the perspective that the method 400 is implemented and performed by, for example, a server or other computing device in a network. Additionally, FIG. 4 will be discussed in conjunction with FIG. 5, which illustrates a sequence 500 of communications between a server, an event producer, and an event consumer in a network.

The sequence 500 of communications begins when the event consumer (EC) provides a request to the server to register at 510. As discussed above with reference to blocks 310 and 320 of method 300, the server adds an entry to the registration table for the event consumer. In this example, the server does not generate and broadcast a message announcing the registration of the event consumer because, for example, the server determines that there are no event producers registered with the server yet that produce events compatible with the services of the event consumer. In other embodiments, the server may be configured to broadcast messages for newly registered event producers and not event consumers depending on preferences of a system administrator.

Figure 5:
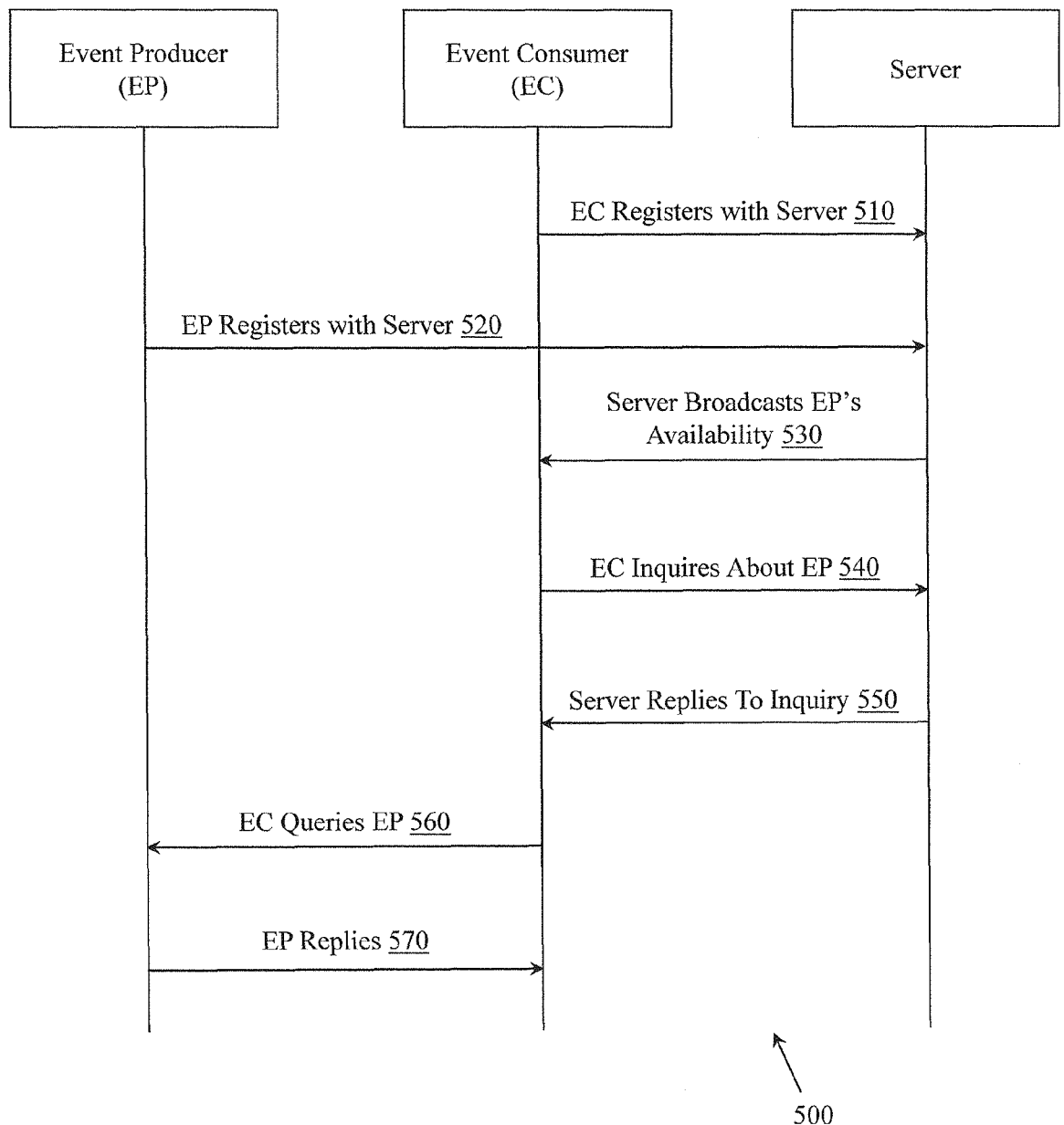
FIG. 5 illustrates one example of a sequence of communications associated with automatic registration and discovery of services in a network.

Continuing with FIG. 5, at some point in time the event producer provides a request to register to the server at 520. The communication at 520 of sequence 500 corresponds to 410 of method 400. At 410, the request is received by the server. At 420 of method 400, similar to 320 of method 300, the event producer is registered by adding the information from the request about the event producer to the registration table in the server. Additionally, at 430, similar to 330 of method 300, method 400 includes generating a message with information about the event producer to send to device(s) on the network.

At 440, a subset of devices from available event consumers on the network that are registered with the server are selected. In one embodiment, the server may have a plurality of event consumers registered. Of the registered event consumers, some may be unavailable due to a current processing load or because of a discrepancy in program versions with the event producer. In either case, the server can select a subset of the event consumers to send the message to, at 450, in order to use network resources more efficiently by avoiding duplicity of the message 530.

Accordingly, the message is transmitted to the subset of event consumers at 450. In the present example, there is a single event consumer and the communication at 530 of FIG. 5 illustrates the transmission of the message generated at 430 to the event consumer. In response to the message 530 of sequence 500, at 450 of method 400, the event consumer sends an inquiry 540 to the server for a complete profile of information for the event producer at 460. Since the information in the communication at 530 does not include a complete description of the new event producer, but rather a basic indicator of the new event producer, the event consumer requests the complete set of information before initiating communication with the event producer. Alternatively, the event consumer can decide to not inquire about the new event producer if, for example, a current processing load of the event consumer exceeds a maximum amount, or if another event consumer has priority over event consumer 135.

Continuing with method 400, at 470, the XML template with the complete set of information about the new event producer is sent to the event consumer in a communication 550. Receiving the communication 550 with the complete XML templates causes the event consumer to initiate communications with the event producer by sending a query 560 to the event producer. The event producer receives the query 560 and sends a reply 570 to the event consumer to confirm that events generated by the event producer will be sent to the event consumer for processing. Thus, the event producer discovers the event consumer after sending a single registration request to the server.

The server effectively directs a discovery process for the event producer in which the network was polled for event consumers. The event producer's attributes where provided to interested event consumers and the event consumer finally contacts the event producer without any provocation form the event producer itself. Accordingly, the discovery process is automated and removes efforts from the event producer while using platform independent interfaces between the devices.

In addition to establishing communications with the event consumer as described, the event producer can periodically query the registration table in the server to discover any newly registered event consumer that has been added to the network that is better suited for handling events of the type generated by the event producer. While, in one embodiment, the server is configured to initiate communications between new event consumers and event producers that are already present on the network, in other embodiments, the server does not initiate communications between an event producer and a new event consumer if the event producer is already communicating with an event consumer. Accordingly, in such a circumstance, the event producer can, based on a local configuration of the event producer, inquire to the server for an updated list of event consumers.

Figure 6:
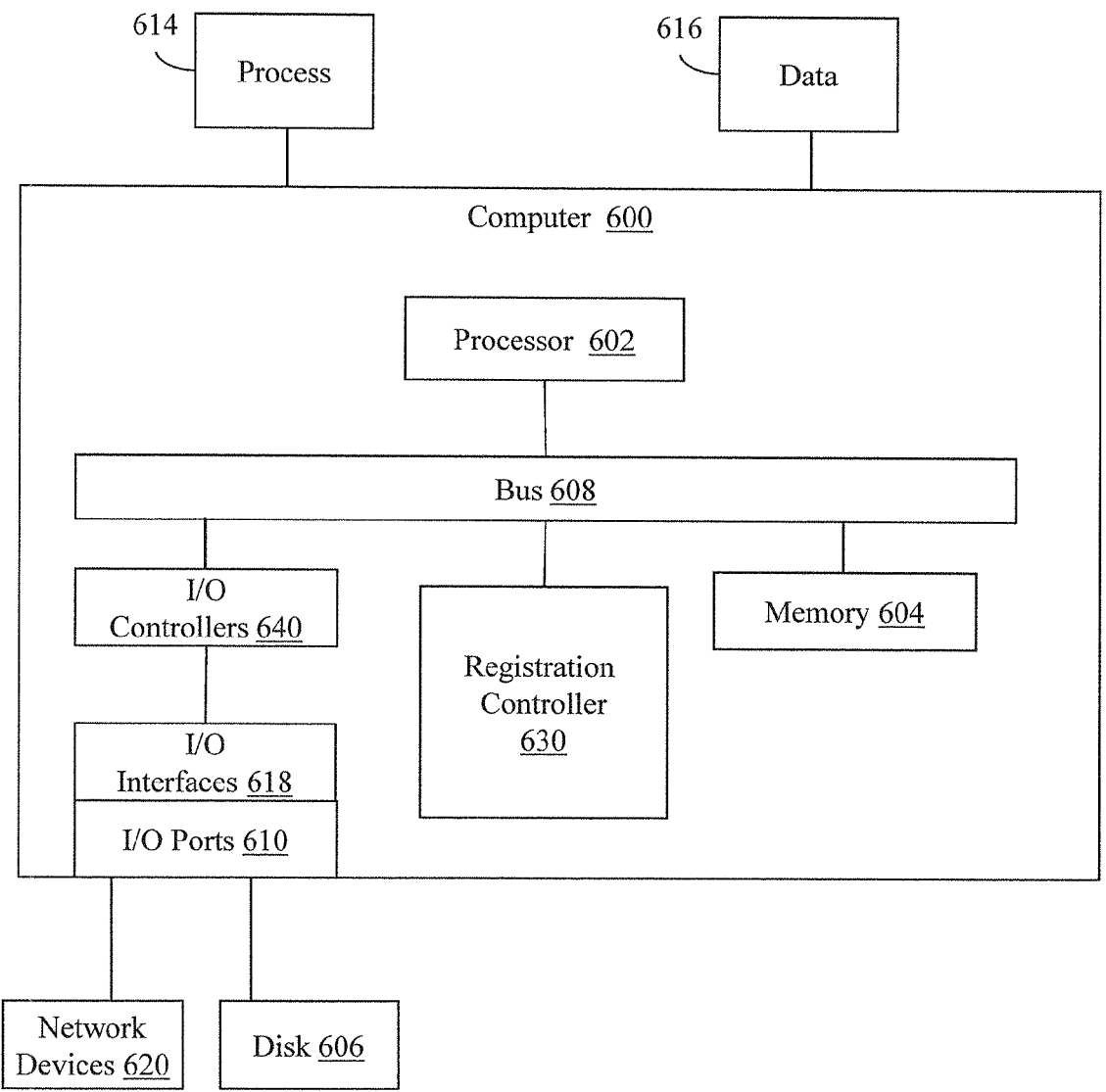
FIG. 6 illustrates an embodiment of a computing system in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a registration controller 630 configured to facilitate platform independent automatic registration and discovery of event producers/consumers in a network. In different examples, the controller 630 may be implemented in hardware, a non-transitory computer-readable medium with stored instructions, firmware, and/or combinations thereof. While the controller 630 is illustrated as a hardware component attached to the bus 608, it is to be appreciated that in one example, the controller 630 could be implemented in the processor 602.

In one embodiment, controller 630 is a means (e.g., hardware, non-transitory computer-readable medium, firmware) configured to provide the disclosed functions for platform independent automatic registration and discovery of event producers/consumers in a network. The means may be implemented, for example, as an ASIC programmed to register new devices and notify registered devices on the network. The means may also be implemented as stored computer executable instructions that are presented to computer 600 that are temporarily stored in memory 604 and then executed by processor 602.

Controller 630 may also provide means (e.g., hardware, non-transitory computer-readable medium that stores executable instructions, firmware) for manipulating XML data in XML templates. Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
LAN: local area network.
RAM: random access memory.
DRAM: dynamic RAM.
SRAM: synchronous RAM.
ROM: read only memory.
PROM: programmable ROM.
XML: extensible markup language.
WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that are executable by a network server, the instructions including instructions for:
   receiving, by the network server, a Domain Name Service (DNS) registration request from a first remote device to add an entry that identifies an event producer into a registration table, wherein the event producer is a process on the first remote device that generates an event that is to be processed in a distributed computing environment by at least one event consumer, wherein the at least one event consumer is a shared application service that processes events generated by event producers on the network,
   wherein the DNS registration request includes additional information describing the event producer that indicates at least services used by the event producer that are application services provided by the at least one event consumer using remote procedure calls, wherein the additional information is information that is not used for DNS registration;
   in response to the DNS registration request, adding the entry to the registration table by modifying an extensible markup language (XML) template in the registration table with attributes of the event producer from the DNS registration request;
   generating a message that includes a portion of the XML template upon the event producer being added to the registration table;
   automatically broadcasting the message to the at least one event consumer listed in the registration table that is capable of processing events from the event producer in response to the event producer being registered;
   in response to the broadcasted message, receiving, in the network server from an event consumer on a second remote device, a query for additional information about the event producer, wherein the broadcasted message is a notice that the event producer has been newly registered; and
   sending the XML template for the event producer to the event consumer, wherein the XML template causes the event consumer to initiate communications with the event producer to process distributed events produced by the event producer.

2. The non-transitory computer-readable medium of claim 1, wherein the interface in the network server is an application programming interface (API) that provides access to XML data in the registration table for devices on the network, and wherein the access is independent of a native operating language of the devices.

3. The non-transitory computer-readable medium of claim 1, further comprising instructions for: receiving a request to add a new event consumer to the registration table through a platform independent interface; and automatically broadcasting an availability message to event producers associated with services provided by the new event consumer, wherein the availability message indicates that the new event consumer is available.

4. The non-transitory computer-readable medium of claim 1, further comprising instructions for: periodically receiving a refresh inquiry from the event producer to determine if a new event consumer has been registered in the registration table.

5. The non-transitory computer-readable medium of claim 1, wherein automatically broadcasting the message to the at least one event consumer includes determining a subset of event consumers available on the network that process requests for services associated with the event producer and transmitting the message to the subset of event consumers.

6. The non-transitory computer-readable medium of claim 1, wherein the network server is a lightweight directory access protocol (LDAP) server that is integrated with a domain name system (DNS) server, and wherein the DNS request is received through an interface in the network server that is platform independent.

7. A registration controller embodied in a network server, the registration controller comprising:
   registration logic configured to add an entry for an event producer to a registration table stored in a non-transitory computer readable medium by modifying an extensible markup language (XML) template in the registration table with attributes of the event producer from a Domain Name Service (DNS) registration request, and to generate a message that includes at least a portion of the XML template upon the event producer being added to the registration table,
   wherein the event producer is a process on a first remote device that generates an event that is to be processed in a distributed computing environment by at least one event consumer, wherein the at least one event consumer is a shared application service that processes events generated by event producers on the network, and wherein the DNS registration request includes additional information describing the event producer that indicates at least services used by the event producer that are application services provided by the at least one event consumer using remote procedure calls, wherein the additional information is information that is not used for DNS registration; and an interface logic configured to receive, from the first remote device, the DNS registration request to add the entry that identifies the event producer into the registration table, and to automatically broadcast the message electronically to the at least one event consumer listed in the registration table that is capable of processing events from the event producer, wherein the interface logic is configured to receive, from an event consumer on a second remote device in response to the message, a query for additional information about the event producer, and wherein the interface logic is configured to send the XML template for the event producer to the event consumer in response to the query, wherein the XML template causes the event consumer to initiate communications with the event producer to process distributed events produced by the event producer.

8. The registration controller of claim 7, wherein the DNS registration request is received and broadcast through an interface that is platform independent wherein the interface is an application programming interface (API) that provides access to XML data in the registration table for devices on the network, and wherein the access is independent of a native operating language of the devices.

9. The registration controller of claim 7, wherein the interface logic is configured to receive a request to add a new event consumer to the registration table, and to automatically broadcast to event producers associated with services provided by the new event consumer a message indicating that the new event consumer is available.

10. The registration controller of claim 7, wherein the interface logic is configured to: automatically broadcast the message to the at least one event consumer by determining a subset of event consumers available on the network that process requests for services associated with the event producer, and transmit the message to the subset of event consumers.

11. The registration controller of claim 7, wherein the interface that is platform independent is an application programming interface (API) that is configured to interface with an application layer of a network interface card (NIC) associated with the registration controller.

12. The registration controller of claim 7, wherein the registration controller is embodied in the network server that is a lightweight directory access protocol (LDAP) server that is integrated with a domain name system (DNS) server.

13. A computer-implemented method, comprising:
adding an entry to a registration table, stored in a memory of the network server, for an event producer by modifying an extensible markup language (XML) template in the registration table with attributes of the event producer from a domain registration request that indicates additional information describing the event producer including at least services used by the event producer that are application services provided by an event consumer using remote procedure calls, wherein the additional information is information that is not used for domain name system (DNS) registration, wherein the domain registration request is received by the network server from a first remote device to register with the network server, and wherein the event producer is a process that generates an event that is to be processed in a distributed computing environment by the event consumer, wherein the event consumer is a shared application service that processes events generated by event producers on a network;

automatically broadcasting a message to the at least one event consumer listed in the registration table that is capable of processing events from the event producer in response to the event producer being registered;

receiving, from an event consumer on a second remote device in response to the message, a query for additional information about the event producer; and sending the XML template for the event producer to the event consumer, wherein the XML template causes the event consumer to initiate communications with the event producer to process distributed events produced by the event producer.

14. The computer-implemented method of claim 13, wherein the request is received in a network server through an interface that is platform independent, and wherein the interface is an application programming interface (API) that interfaces with the application layer of a network interface card (NIC) associated with the network server.

15. The computer-implemented method of claim 13, wherein the interface is an application programming interface (API) that provides access to XML data in the registration table for devices on the network, and wherein the access is independent of a native operating language of the devices.

16. The computer-implemented method of claim 13, wherein the message includes a portion of the XML template that is less than a whole of the XML template.

17. The computer-implemented method of claim 13, wherein the network server is a lightweight directory access protocol (LDAP) server that is integrated with a domain name system (DNS) server, and wherein the domain registration request to add an entry in the registration table is a DNS registration request.

* * * * *